Patented Mar. 18, 1952

2,589,224

UNITED STATES PATENT OFFICE 2,589,224

BASIC ESTERS OF SUBSTITUTED BENZOYL-ALIPHATIC ACIDS AND SALTS THEREOF

Robert R. Burtner, Skokie, Ill., assignor to G. D. Searle & Co., Chicago, Ill., a corporation of Illinois No Drawing. Application May 3, 1950, Serial No. 159,860

19 Claims. (Cl. 260—473)

This invention relates to N,N-disubstituted aminoalkanol esters of substituted benzoylaliphatic acids and salts thereof. More particularly this invention relates to esters, and salts thereof, of the general structural formula:

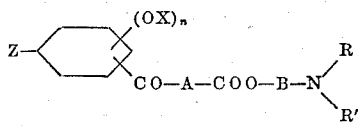

wherein A and B are bivalent aliphatic hydrocarbon radicals, X is a lower alkyl radical, n is an integer smaller than 3, NRR' is a member of the class consisting of dialkylamino radicals and saturated nitrogen containing heterocyclic radicals attached to the radical B through the nitrogen in the heterocycle, and wherein Z is a member of the class consisting of cycloalkyl radicals and radicals of the structural formula Cycloalkyl—Y— wherein Y is a bivalent aliphatic hydrocarbon radical.

In the foregoing structural formula, the bivalent aliphatic hydrocarbon radicals represented by A and B contain 2 to 8 carbon atoms in straight or branch-chained configuration. Among the groups which these radicals A and B may represent are ethylene, propylene, butylene, amylene, hexylene and polymethylene groups from dimethylene to octamethylene. In the case of the radical A unsaturated aliphatic hydrocarbon radicals such as vinylene and allylene are likewise within the scope of this invention. X represents a lower alkyl radical such as methyl, ethyl, propyl, isopropyl, butyl, isobutyl, tertiary butyl and the like. Among the radicals which Z may represent are such alicyclic radicals as cyclobutyl, cyclopentyl, cyclohexyl and cycloheptyl, as well as alkyl and alkoxyl derivatives thereof. Such alicyclic radicals may be attached to the benzene ring directly or through a bivalent aliphatic hydrocarbon group of the same class as radical B above, but preferably methylene. R and R' represent lower alkyl groups such as methyl, ethyl, propyl, butyl, amyl, hexyl and cyclohexyl, wherein the propyl, butyl, amyl and hexyl groups may be either of the straight chain or branched chain type. The radical NRR' may also be a part of a nitrogen containing heterocyclic group such as an N-piperidino, N-lupetidino, N-pyrrolidino, N-thiamorpholino or morpholino group.

The basic esters of the foregoing type form salts with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, dimethyl sulfate, diethyl sulfate, methyl benzenesulfonate, ethyl toluenesulfonate, ethylene chlorohydrin, propylene bromohydrin, allyl bromide.

It is the object of this invention to provide novel chemical substances of the foregoing type. It is a further object of this invention to provide simple and economical methods of producing such substances. It is still another object to provide feasible synthetic methods for the foregoing substances from readily available starting materials. Certain of these esters are effective choleretic agents. Others find their special usefulness in their spasmolytic activity. They are usually administered in the form of the soluble salts.

Various methods for the synthesis of the acids used as intermediates in the preparation of these esters have been described in the pending patent applications Serial Nos. 93,412 and 150,549, filed May 14, 1949, and March 18, 1950, now Patent No. 2,580,402, respectively. These acids may be esterified by conventional methods. For instance, a solution of the acid in an anhydrous organic solvent, such as a lower aliphatic alcohol, may be heated with an excess of a compound of the type Halogen—B—NRR' in a similar anhydrous organic solvent miscible in the first. The hydrohalide of the ester thus formed may be converted to the free basic ester by treatment with alkali either in the original solvent or by distilling off the latter and taking up the salt in a new solvent such as water and the rendering same alkaline. The basic esters thus obtained may then be converted into other salts of inorganic and strong organic acids or into such quaternary salts as indicated above.

My invention is disclosed in further detail by the following characteristic examples. These are intended merely to illustrate the invention and are not to be construed as limiting the invention in spirit or in scope. It will be apparent to chemists skilled in the art that many modifications may be made with regard to reagents and conditions without departing from the scope of the invention. In these examples, temperatures are given in degrees centigrade, relative amounts of materials in parts by weight and pressures during vacuum distillations in millimeters (mm.) of mercury.

EXAMPLE 1

*β-Diethylaminoethyl ester of β-(2-methoxy-5-cyclohexylbenzoyl) propionic acid*

114.5 parts of p-cyclohexylanisole are reacted with 76 parts of succinic anhydride in 900 parts of nitrobenzene in the presence of 204 parts of anhydrous aluminum chloride at 5° C. over 30 minutes with good agitation. The mixture is maintained at 3° to 7° C. during the addition and for 2 hours longer, efficient agitation being maintained throughout. The reaction mixture is allowed to stand at room temperature for about 15 hours and is then quenched with dilute hydrochloric acid and ice. The mixture is steam distilled to remove the solvent and the aqueous residue is chilled and filtered. The crystalline β-(2-methoxy-5-cyclohexylbenzoyl) propionic acid is washed with water and dissolved in 200 parts of hot water containing 30 parts of sodium hydroxide. The hot solution is treated with decolorizing charcoal, filtered, chilled and acidified. A fine granular precipitate of the acid is collected on a filter, rinsed with water, dried, and then recrystallized from toluene. The acid is obtained in the form of clusters of needles which melt at about 159° C.

A solution of 234 parts of this acid and 114 parts of β-diethylaminoethyl chloride in 1350 parts of isopropanol is refluxed with stirring for 4 hours. During this reaction a small amount of dimeric substance is formed. To remove the latter the reaction mixture is filtered while still hot. The solvent is removed from the filtrate under vacuum and the residual oil is dissolved in 5000 parts of water. An excess of dilute alkali is added and the free base is extracted with ether. The ether extract is washed well with water and dried over anhydrous sodium sulfate. The solution is then filtered and on evaporation of the ether the β-diethylaminoethyl ester of β-(-2-methoxy-5-cyclohexylbenzoyl) propionic acid remains. In order to prepare the hydrochloride one dissolves the ester base obtained in 2150 parts of anhydrous ether and adds one equivalent of absolute alcoholic hydrochloric acid. The oily hydrochloride becomes crystalline on standing for a short time in the refrigerator. The crystals are filtered, rinsed with ether and dried. The hydrochloride may be recrystallized from methyl ethyl ketone, using charcoal as a clarifying agent, and the resultant colorless needles melt at about 136° C.

EXAMPLE 2

*Methobromide of the β-diethylaminoethyl ester of β-(2-methoxy-5-cyclohexylbenzoyl) propionic acid*

The pure hydrochloride obtained as in Example 1 is reconverted into the free base by treatment with an excess of dilute alkali, extraction with ether, drying of the ether extract over anhydrous sodium sulfate and removal of the solvent by evaporation. 200 parts of this ester base are dissolved in 650 parts of methyl ethyl ketone and treated with a slow stream of methyl bromide for one hour. The resulting clear solution is evaporated under vacuum to give 245 parts of a viscous glass-like product which crystallizes on standing for several days. This β-(2-methoxy-5-cyclohexylbenzoyl) propionate of β-(hydroxyethyl)-diethylmethylammonium bromide is recrystallized from a mixture of 470 parts of isopropanol and 1250 parts of anhydrous ether. Filtration, rinsing with ether and drying yields snow white crystals which melt at about 124–125° C. This compound has the structural formula

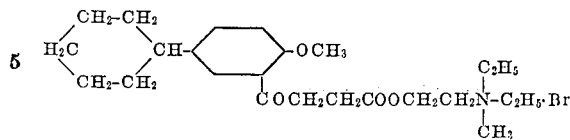

This bromide may be readily converted into other salts. Thus treatment of 3 mols. of the bromide in absolute methanol with one mol. of silver citrate and two mols. of citric acid yields the citrate.

EXAMPLE 3

*β-Diethylaminoethyl ester of β-(2,4-dimethoxy-5-cyclohexylbenzoyl) propionic acid*

4-cyclohexylresorcinol dimethyl ether is prepared form 4-cyclohexylresorcinol by methylation with dimethyl sulfate in dilute alkali. It distils at about 121° C. at 0.3 mm. pressure; $n_D^{24}=1.5361$. It can also be produced by the reaction of resorcinol dimethyl ether with cyclohexyl bromide in carbon disulfide in the presence of anhydrous aluminum chloride.

354 parts of anhydrous aluminum chloride are added over 15–30 minutes to an agitated suspension of 290 parts of 4-cyclohexylresorcinol dimethyl ether and 132 parts of succinic anhydride in 1600 parts of nitrobenzene at 5° C. The mixture is agitated for about an hour at 5° C. and then for 4 hours at room temperature. It is quenched in ice and acid, steam distilled, chilled and the tacky precipitate separated from the aqueous layer. The precipitate is taken up in 15,000 parts of 2% sodium carbonate solution at 85° C. The hot solution is treated with activated carbon, filtered, chilled and acidified. The precipitate of β-(2,4-dimethoxy-5-cyclohexylbenzoyl) propionic acid soon granulates. It is crystallized from methanol and melts at about 168° C.

A solution of 480 parts of this acid and 204 parts of β-diethylaminoethyl chloride in 2600 parts of isopropanol is refluxed with stirring for 6 hours. Traces of a dimer form, which are removed by filtering while the solution is still hot. The solvent is removed by vacuum distillation and the residue is dissolved in 4000 parts of water. An excess of dilute alkali is added in order to precipitate the β-diethyl-aminoethyl ester of β-2,4-dimethoxy-5-cyclohexylbenzoyl) propionic acid. The product is then extracted with ether, the extract washed well with water and dried over anhydrous sodium sulfate. The sodium sulfate is filtered off and the ether evaporated from the filtrate. The residue is dissolved in 3200 parts of anhydrous ether and one equivalent of absolute alcoholic hydrochloric acid is added. The oily hydrochloride crystallizes within a short time. The produce is triturated with ether, filtered and dried. Upon recrystallization from a mixture of 675 parts of isopropanol and 3100 parts of ethyl acetate, using charcoal as a clarifying agent, the hydrochloride is obtained in form of colorless crystals which are readily soluble in water and melt at about 128° C.

EXAMPLE 4

*Ethiodide of the β-diethylaminoethyl ester of β-(2,4-dimethoxy-5-cyclohexylbenzoyl) propionic acid*

The pure hydrochloride obtained by the method of Example 3 is reconverted into the free base by treatment with an excess of dilute alkali, extraction with ether, drying of the ether extract over sodium sulfate and removal of the solvent by evaporation. 190 parts of the ester base thus obtained are permitted to stand at room temperature for 20 hours with 718 parts of ethyl iodide in 610 parts of methyl ethyl ketone. The clear solution is evaporated to dryness under vacuum. The crude β-(2,4-dimethoxy-5-cyclohexylbenzoyl)propionate of β-(2-hydroxyethyl)-triethylammonium iodide appears as a dark yellow glass like material. Crystallization from a mixture of 470 parts of isopropanol and 650 parts of anhydrous ether yields colorless crystals which are moderately soluble in warm water. This compound has the following structural formula and melts at about 164° C.

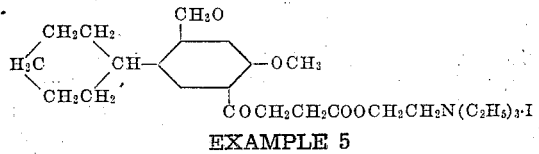

EXAMPLE 5

*γ-Dimethylaminopropyl ester of δ-(2-methoxy-5-cyclohexylbenzoyl)valeric acid*

63 parts of p-cyclohexylanisole and 58.9 parts of δ-carbomethoxyvaleryl chloride in 400 parts of nitrobenzene at 5–10° C. are treated with 88 parts of anhydrous aluminum chloride over a period of 30 minutes. The reaction mixture is stirred for 3 hours at 0° C. and then allowed to stand for 15 hours at room temperature. The acid is isolated as in Example 1. It is dissolved in ether and extracted with 5% sodium hydroxide solution. The ether solution is then evaporated, yielding an oily residue of methyl δ-(2-methoxy-5-cyclohexylbenzoyl) valeric acid. This is dissolved in 400 parts of methanol containing 40 parts of sodium hydroxide and refluxed for 30 minutes. Approximately one half of the solvent is removed under vacuum and the remaining solution is diluted with 1000 parts of water. The resulting solution is washed with ether to remove neutral material and then acidified to form a viscous precipitate of δ-(2-methoxy-5-cyclohexylbenzoyl)valeric acid. This material is separated, dried, and then recrystallized from cyclohexane. After recrystallization from methanol it forms colorless crystals melting at about 95° C.

A solution of 318 parts of this acid and 108 parts of γ-dimethylaminopropyl chloride in 2000 parts of isopropanol is refluxed with stirring for 5 hours. The solvent is removed from the filtrate by vacuum distillation and the residual oil taken up in a large volume of water. Somewhat more than the theoretical amount of dilute sodium hydroxide is added and the free ester base is extracted with ether. The ether extract is washed repeatedly with water, dried over anhydrous sodium sulfate and filtered. Evaporation of the ether leaves the oily γ-dimethylaminopropyl ester of δ-(2-methoxy-5-cyclohexylbenzoyl) valeric acid. The base forms a crystalline hydrochloride and hydrobromide by the method described in Example 1.

EXAMPLE 6

*β-Dimethylaminopropyl ester of β-(3-cyclohexyl-4-methoxybenzoyl)acrylic acid*

95 parts of o-cyclohexylanisole are reacted in 600 parts of nitrobenzene with 50 parts of maleic anhydride in the presence of 139 parts of anhydrous aluminium chloride by the procedure of Example 1. After the reaction mixture is quenched and steam distilled the crude residual acid is taken up in 2000 parts of water containing 65 parts of sodium carbonate at room temperature, filtered, and acidified. The precipitate of β-(3-cyclohexyl-4-methoxybenzoyl)acrylic acid soon granulates. This is separated, washed, and recrystallized from methanol. It forms bright yellow crystals melting at about 178° C.

A solution of 144 parts of this acid and 54 parts of β-dimethylaminopropyl chloride in 1000 parts of isopropanol is heated at reflux temperature with agitation for a period of 4 hours. A small amount of dimer forms during this reaction. The mixture is filtered hot, the solvent is removed from the filtrate under vacuum and the residue dissolved in water. An excess of dilute sodium hydroxide is added and the free ester base is extracted with ether. The ether extract is washed several times with water and dried over sodium sulfate. The solution is then filtered and the ether evaporated. The residue consists of

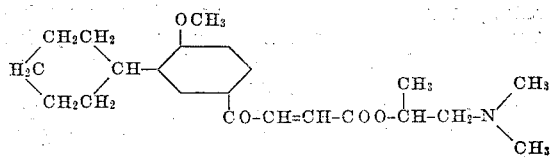

A crystalline hydrochloride is obtained by the method of Example 1.

EXAMPLE 7

*β-Morpholinoethyl ester of β-(2,4-dimethoxy-5-cyclopentylmethylbenzoyl)propionic acid*

To a suspension of 350 parts of 2,4-dimethoxybenzylcyclopentane and 160 parts of succinic anhydride in 1920 parts of nitrobenzene 437 parts of anhydrous aluminum chloride are added portionwise with good agitation. During the addition and for an additional 15 minutes the temperature is maintained at 0° to 5° C. efficient agitation being used throughout. Stirring at room temperature is continued for three hours. Hydrolysis is effected by quenching with dilute hydrochloride acid and ice. The mixture is steam distilled to remove solvent and the aqueous residue chilled. The semi-solid crude product is taken up in 2000 parts of water containing 30 parts of sodium carbonate at about 90° C. The hot solution is cooled, washed once with ether and then heated to remove all ether residues. After cooling the solution is acidified, the sand color acid is filtered, rinsed with water and dried. 265 parts of the crude β-(2,4-dimethoxy-5-cyclopentylmethylbenzoyl)propionic acid are obtained. Two recrystallizations from five volumes of methanol, using charcoal as a clarifying agent, give pure, colorless crystals melting at about 159–160° C.

A solution of 160 parts of this acid and 75 parts of N-(β-chloroethyl)morpholine in 1100 parts of isopropanol is heated at reflux temperature with stirring for 5 hours. The solution is filtered in order to remove the dimer. The solvent is removed by vacuum distillation and the residue is dissolved in water. An excess of dilute alkali is added in order to precipitate the β-morpholinoethyl ester of β-(2,4-dimethoxy-5-cyclopentylmethylbenzoyl)propionic acid. The product is then extracted with ether, the extract washed well with water and dried over anhydrous sodium sulfate. The sodium sulfate is filtered off, and the ether evaporated in a vacuum. The residue is dissolved in anhydrous ether and one equivalent of a 25% solution of hydrogen chloride in absolute ethanol is added. The hydrochloride crystallizes on standing. It may be further purified by the method described in Examples 1 and 3. The base has the structural formula

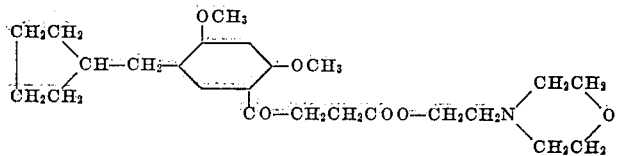

EXAMPLE 8

*β-N-piperidinoethyl ester of β-(2-methoxy-5-cyclohexylethylbenzoyl)propionic acid*

Cyclohexylacetyl chloride is condensed with anisole in nitrobenzene using aluminum chloride as a catalyst in order to prepare p-(cyclohexylacetyl)anisole, which boils at 135–136° C. at 0.3 mm. pressure. Clemmensen reduction in a mixture of hydrogen chloride and toluene yields p-cyclohexylethylanisole of a boiling point of 128–130° C. at 0.8 mm. pressure.

300 parts of p-cyclohexylethylanisole and 140 parts of succinic anhydride suspended in 1800 parts of nitrobenzene are reacted with good agitation at 0° C. to 5° C. with 375 parts of anhydrous aluminium chloride which is added portionwise. After completion of the addition, stirring at 0° C. is continued for one hour. The mixture is then permitted to warm up to room temperature and, after 15 hours standing, is quenched with dilute hydrochloric acid and ice. The solvent is removed by steam distillation and the aqueous residue is chilled. The dark, tacky crude acid is taken up in 1000 parts of water containing 30 parts of sodium carbonate at about 90° C. The hot solution is filtered, cooled, washed once with ether and the residual ether removed by heating. The solution is then chilled, and upon acidification a light brown oil separates which becomes granular on standing. The precipitate of the β-(2-methoxy-5-cyclohexylethylbenzoyl)propionic acid is collected on a filter, rinsed with water, dried, and then recrystallized from cyclohexane. The colorless crystals melt at about 103° C.

A solution of 318 parts of this acid and 148 parts of N-(β-chloroethyl)piperidine in 2300 parts of isopropanol is stirred at reflux temperature for 6 hours. The mixture is then filtered while hot and the solvent removed from the filtrate by vacuum distillation. The residue is dissolved in a large volume of water and an excess of dilute sodium hydroxide is added in order to precipitate the β-N-piperidinoethyl ester of β-(2-methoxy-5-cyclohexylethylbenzoyl)propionic acid. The product may be purified as in Example 7, and forms crystalline salts with hydrobromic and hydrochloric acids. It has the structural formula

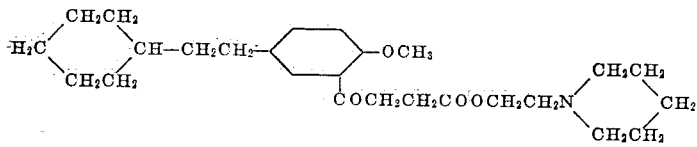

I claim:
1. A compound of the structural formula

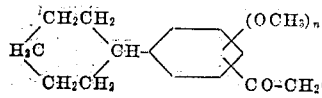

wherein R and R' are lower alkyl radicals and $n$ is an integer smaller than three.

2. A quaternary salt of the structural formula

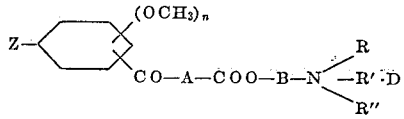

wherein A and B are bivalent aliphatic hydrocarbon radicals containing at least two and not more than eight carbon atoms, R, R' and R'' are lower alkyl radicals, $n$ is an integer smaller than three, Z is a cycloalkyl radical containing at least five and not more than six cyclic carbon atoms, and D is one equivalent of an anion.

3. A quaternary salt of the structural formula

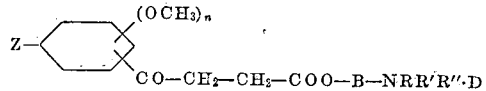

wherein B is a bivalent aliphatic hydrocarbon radical containing at least two and not more than eight carbon atoms, R, R' and R'' are lower alkyl radicals, $n$ is an integer smaller than three, Z is a cycloalkyl radical containing at least five and not more than six cyclic carbon atoms and D is one equivalent of an anion.

4. A compound of the structural formula

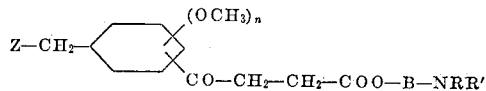

wherein B is a bivalent aliphatic radical containing at least two and not more than eight carbons atoms, R and R' are lower alkyl radicals, $n$ is an integer smaller than three and Z is a cycloalkyl radical containing at least five and not more than six cyclic carbon atoms.

5. A compound of the structural formula

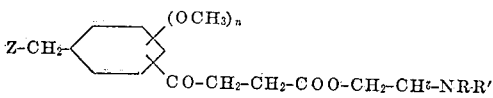

wherein R and R' are lower alkyl radicals, $n$ is an integer smaller than three and Z is a cycloalkyl radical containing at least five and not more than six cyclic carbon atoms.

6. A compound of the structural formula shown in claim 5, wherein R and R' are lower alkyl radicals, $n$ is an integer smaller than three and Z is a cyclohexyl radical.

7. A quaternary salt of the structural formula

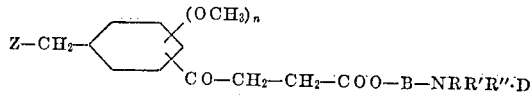

wherein B is a bivalent aliphatic radical containing at least two and not more than eight carbon atoms, R, R' and R'' are lower alkyl radicals, $n$ is an integer smaller than three, Z is a cycloalkyl radical containing at least five and not more than six cyclic carbon atoms, and D is one equivalent of an anion.

8. A quaternary salt of the structural formula

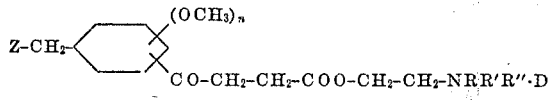

wherein R, R' and R'' are lower alkyl radicals, $n$ is an integer smaller than three, Z is a cycloalkyl radical containing at least five and not more than six cyclic carbon atoms and D is one equivalent of an anion.

9. A quaternary salt of the structure shown in claim 8, wherein R, R' and R'' are lower alkyl radicals, $n$ is an integer smaller than three, Z is a cyclohexyl radical and D is one equivalent of an anion.

10. A member of the class of new organic compounds which consists of the bases of the structural formula

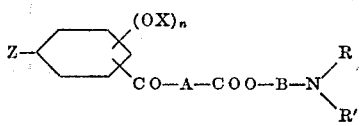

and salts thereof, wherein A and B are lower bivalent aliphatic hydrocarbon radicals containing at least two and not more than eight carbon atoms, X is a lower alkyl radical, $n$ is an integer smaller than three, NRR' is a member of the class consisting of lower dialkylamino radicals and saturated, monocyclic, heterocyclic radicals containing in the ring nitrogen and no additional species of hetero atom other than oxygen, the said heteromonocyclic radical being attached to the radical B through a cyclic nitrogen atom, and Z is a member of the class consisting of cycloalkyl radicals containing at least five and not more than six cyclic carbon atoms and radicals of the structural formula Cycloalkyl—Y— wherein the cycloalkyl radical contains at least five and not more than six carbon atoms and Y is a lower, bivalent, aliphatic hydrocarbon radical containing not more than eight carbon atoms.

11. A compound of the structural formula

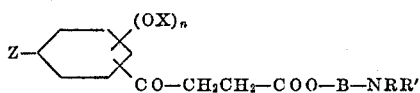

wherein B is a lower bivalent aliphatic hydrocarbon radical containing at least two and not more than eight carbon atoms, X, R and R' are lower alkyl radicals, $n$ is an integer smaller than three, and Z is a cycloalkyl radical containing at least five and not more than six cyclic carbon atoms.

12. A compound of the structural formula

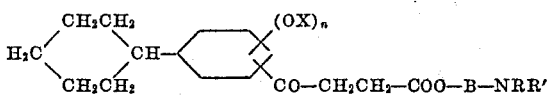

wherein B is a lower bivalent aliphatic hydrocarbon radical containing at least two and not more than eight carbon atoms, X, R, and R' are lower alkyl radicals, and $n$ is an integer smaller than three.

13. A quaternary salt of the structural formula

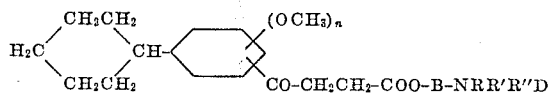

wherein B is a lower bivalent aliphatic hydrocarbon radical containing at least two and not more than eight carbon atoms, R, R' and R'' are lower alkyl radicals, $n$ is an integer smaller than three, and D is one equivalent of an anion.

14. A compound of the structural formula

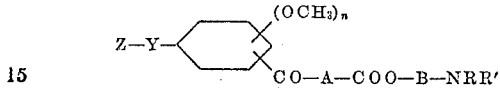

wherein A and B are lower bivalent aliphatic hydrocarbon radicals containing at least two and not more than eight carbon atoms, Y is a lower bivalent aliphatic hydrocarbon radical containing not more than eight carbon atoms, R and R' are lower alkyl radicals, $n$ is an integer smaller than three and Z is a cycloalkyl radical containing at least five and not more than six cyclic carbon atoms.

15. A compound of the structural formula

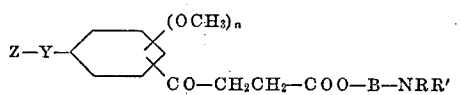

wherein B is a lower bivalent aliphatic hydrocarbon radical containing at least two and not more than eight carbon atoms, Y is a lower bivalent aliphatic hydrocarbon radical containing one to eight carbon atoms, R and R' are lower alkyl radicals, $n$ is an integer smaller than three and Z is a cycloalkyl radical containing at least five and not more than six cyclic carbon atoms.

16. A quaternary salt of the structural formula

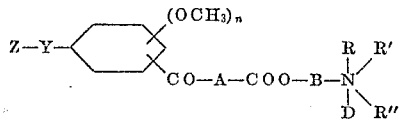

wherein A and B are lower bivalent aliphatic hydrocarbon radicals containing at least two and not more than eight carbon atoms, Y is a lower bivalent aliphatic hydrocarbon radical containing not more than eight carbon atoms, R, R' and R'' are lower alkyl radicals, $n$ is an integer smaller than three, Z is a cycloalkyl radical containing at least five and not more than six cyclic carbon atoms, and D is one equivalent of an anion.

17. A quaternary salt of the structural formula

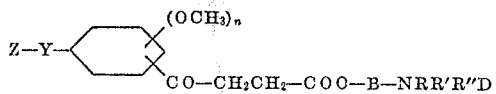

wherein B is a lower bivalent aliphatic hydrocarbon radical containing at least two and not more than eight carbon atoms, Y is a lower bivalent aliphatic hydrocarbon radical containing one to eight carbon atoms, R, R' and R'' are lower alkyl radicals, $n$ is an integer smaller than three, Z is a cycloalkyl radical containing at least five and not more than six cyclic carbon atoms, and D is one equivalent of an anion.

18. β-Diethylaminoethyl β-(2-methoxy-5-cyclohexylbenzoyl) propionate.

19. β-Diethylaminoethyl β-(2,4-dimethoxy-5-cyclohexylbenzoyl) propionate.

ROBERT R. BURTNER.

No references cited.